US009404753B2

(12) United States Patent
Mays et al.

(10) Patent No.: US 9,404,753 B2
(45) Date of Patent: Aug. 2, 2016

(54) NAVIGATING ON IMAGES

(71) Applicant: Navteq B.V., Veldhoven (NL)

(72) Inventors: Joseph P. Mays, Chicago, IL (US); Jeffrey R. Bach, Aurora, IL (US)

(73) Assignee: HERE Global B.V., Eindhoven (NL)

( * ) Notice: Subject to any disclaimer, the term of this patent is extended or adjusted under 35 U.S.C. 154(b) by 71 days.

(21) Appl. No.: 14/162,092

(22) Filed: Jan. 23, 2014

(65) Prior Publication Data

US 2014/0136108 A1    May 15, 2014

Related U.S. Application Data

(62) Division of application No. 12/717,190, filed on Mar. 4, 2010, now Pat. No. 8,660,316.

(51) Int. Cl.
| | | |
|---|---|---|
| *G01C 21/00* | (2006.01) | |
| *G01C 21/34* | (2006.01) | |
| *G01C 21/36* | (2006.01) | |
| *G06K 9/46* | (2006.01) | |
| *G06K 9/64* | (2006.01) | |
| *G01C 21/20* | (2006.01) | |

(52) U.S. Cl.
CPC ............... *G01C 21/00* (2013.01); *G01C 21/20* (2013.01); *G01C 21/3446* (2013.01); *G01C 21/3602* (2013.01); *G06K 9/46* (2013.01); *G06K 9/4671* (2013.01); *G06K 9/64* (2013.01); *G01C 21/3647* (2013.01)

(58) Field of Classification Search
None
See application file for complete search history.

(56) References Cited

U.S. PATENT DOCUMENTS

| | | |
|---|---|---|
| 6,711,293 B1 | 3/2004 | Lowe |
| 6,895,126 B2 | 5/2005 | Di Bernardo et al. |
| 7,260,474 B1 | 8/2007 | Thayathil et al. |
| 7,827,507 B2 | 11/2010 | Geise et al. |
| 2001/0025222 A1 | 9/2001 | Bechtolsheim et al. |
| 2007/0233369 A1 | 10/2007 | Ng et al. |
| 2008/0082264 A1 | 4/2008 | Hill et al. |
| 2008/0291217 A1 | 11/2008 | Vincent et al. |
| 2009/0055093 A1 | 2/2009 | Hamilton, II et al. |
| 2010/0020093 A1 | 1/2010 | Stroila et al. |
| 2010/0021012 A1 | 1/2010 | Seegers et al. |
| 2010/0021013 A1 | 1/2010 | Gale et al. |
| 2010/0023249 A1 | 1/2010 | Mays et al. |
| 2010/0023250 A1 | 1/2010 | Mays et al. |
| 2010/0023251 A1 | 1/2010 | Gale et al. |
| 2010/0023252 A1 | 1/2010 | Mays et al. |

(Continued)

FOREIGN PATENT DOCUMENTS

EP     2148167 A2    1/2010

OTHER PUBLICATIONS

European Search Report and Written Opinion cited in EP10196998, mailed Oct. 13, 2014.

(Continued)

*Primary Examiner* — Nirav G Patel

(74) *Attorney, Agent, or Firm* — Lempia Summerfield Katz LLC

(57) ABSTRACT

Systems, devices, features, and methods for navigating on images are disclosed. For example, one method includes identifying a point selected on an initial image. An image component, such as a pixel, of the initial image corresponding to the identified point is determined. The image component of the initial image represents an origin. A route from the origin to a destination is generated, and the destination corresponds to another image component, such as another pixel.

18 Claims, 7 Drawing Sheets

(56) References Cited

U.S. PATENT DOCUMENTS

2010/0292914 A1 11/2010 Vepsalainen
2010/0329508 A1 12/2010 Chen et al.

OTHER PUBLICATIONS

Lyardet et al., CoINS Content Sensitive Indoor Navigation System, Dec. 11-13, 2006, Eighth IEEE International Symposium on Multimedia.
European Office Action for related European Application No. 10 196 998.8, dated Nov. 20, 2015.

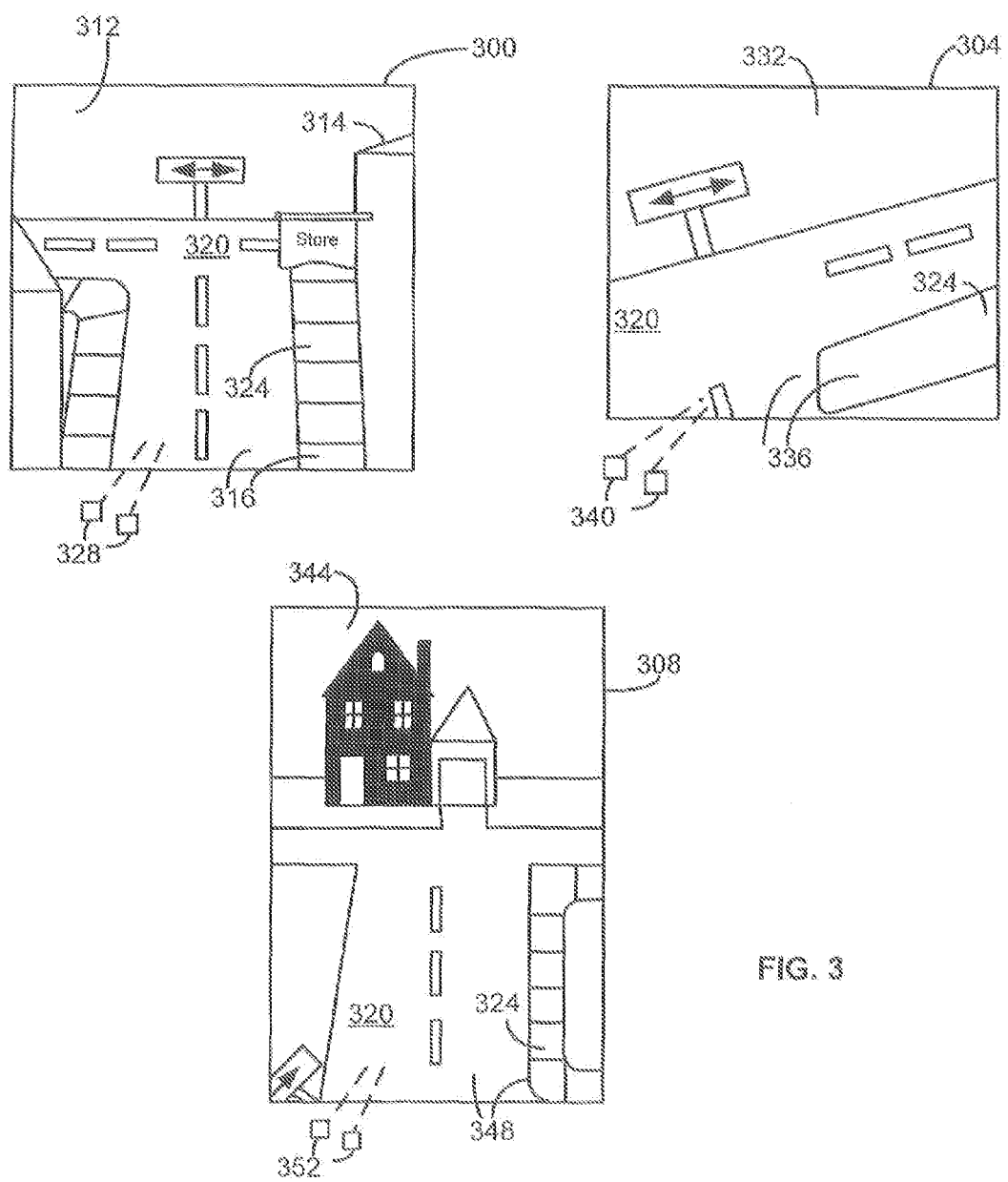

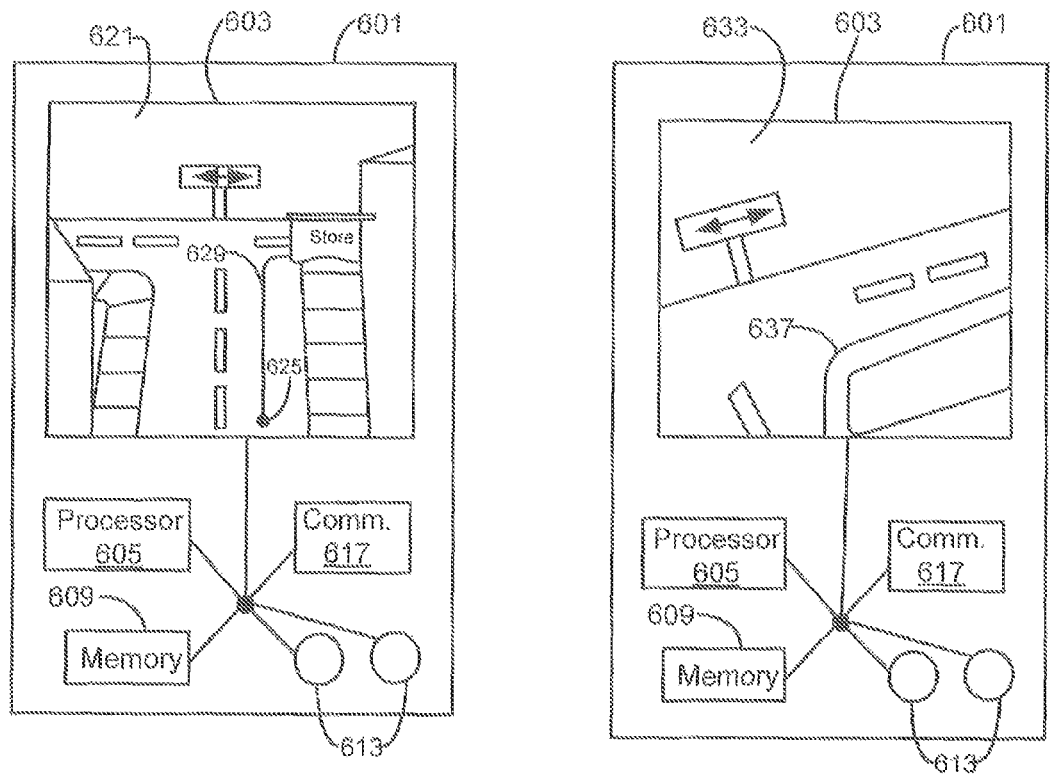
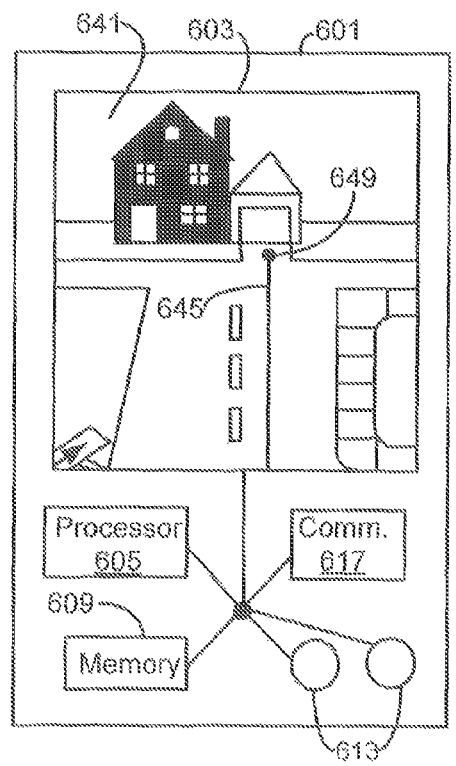
FIG. 6

NAVIGATING ON IMAGES

This application is a divisional application under 37 C.F.R. §1.53(b) and 35 U.S.C. §121 of U.S. patent application Ser. No. 12/717,190 filed Mar. 4, 2010, the disclosure of which is incorporated herein by reference in its entirety

BACKGROUND OF THE INVENTION

The present invention relates to collecting, storing, and/or using data and, more particularly, to navigation using collected data, such as images.

Getting from one place to another has always been part of the human experience. People leave their homes and go to places of work or school. Also, people may travel or go to different places for a variety of other reasons. For example, one may want to go on vacation, run some errands, visit family or friends, go to a restaurant or other desired destination, etc.

A person may rely on his own experience and memory to get to a desired place, such as driving or walking on a routine course. Also, someone may ask someone else for directions as guidance. Furthermore, someone may use technology to help guide and navigate herself to a destination.

For example, one may use a paper map or an electronic map to view the geographic area in which the person wants to travel, and based on understanding the geographic layout, one can direct himself to where he wants to go. Also, navigation systems or devices may provide useful guidance. For example, a navigation system or device can guide a person from an origin to a destination by providing a display of a route and/or directions.

However, such technology may provide guidance based on predetermined structured path or road data. For example, a navigation system may rely on road segment or link data records as well as node data records of a geographic area to construct or generate desired routes. Instead of or in addition to systems and methods that use road or path segment data records, other systems, methods, and/or techniques may be useful to provide navigation.

SUMMARY OF THE INVENTION

According to one aspect, a method of routing on images is provided. For example, the method includes identifying a point selected on an initial image. An image pixel of the initial image corresponding to the identified point is determined. The image pixel of the initial image represents an origin. A route from the origin to a destination is generated, and the destination corresponds to another image pixel. The route may be a connection between the origin and the destination via intermediate image pixels between the image pixel of the initial image and the other image pixel.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

FIG. 2 illustrates an embodiment of components of a device used in the exemplary system of FIG. 1.

FIG. 3 illustrates an embodiment of images collected and/or used via the exemplary system of FIG. 1.

FIG. 6 illustrates exemplary displays of a user device associated with the exemplary system of FIG. 1.

DETAILED DESCRIPTION OF THE PRESENTLY PREFERRED EMBODIMENTS

Figure 1:
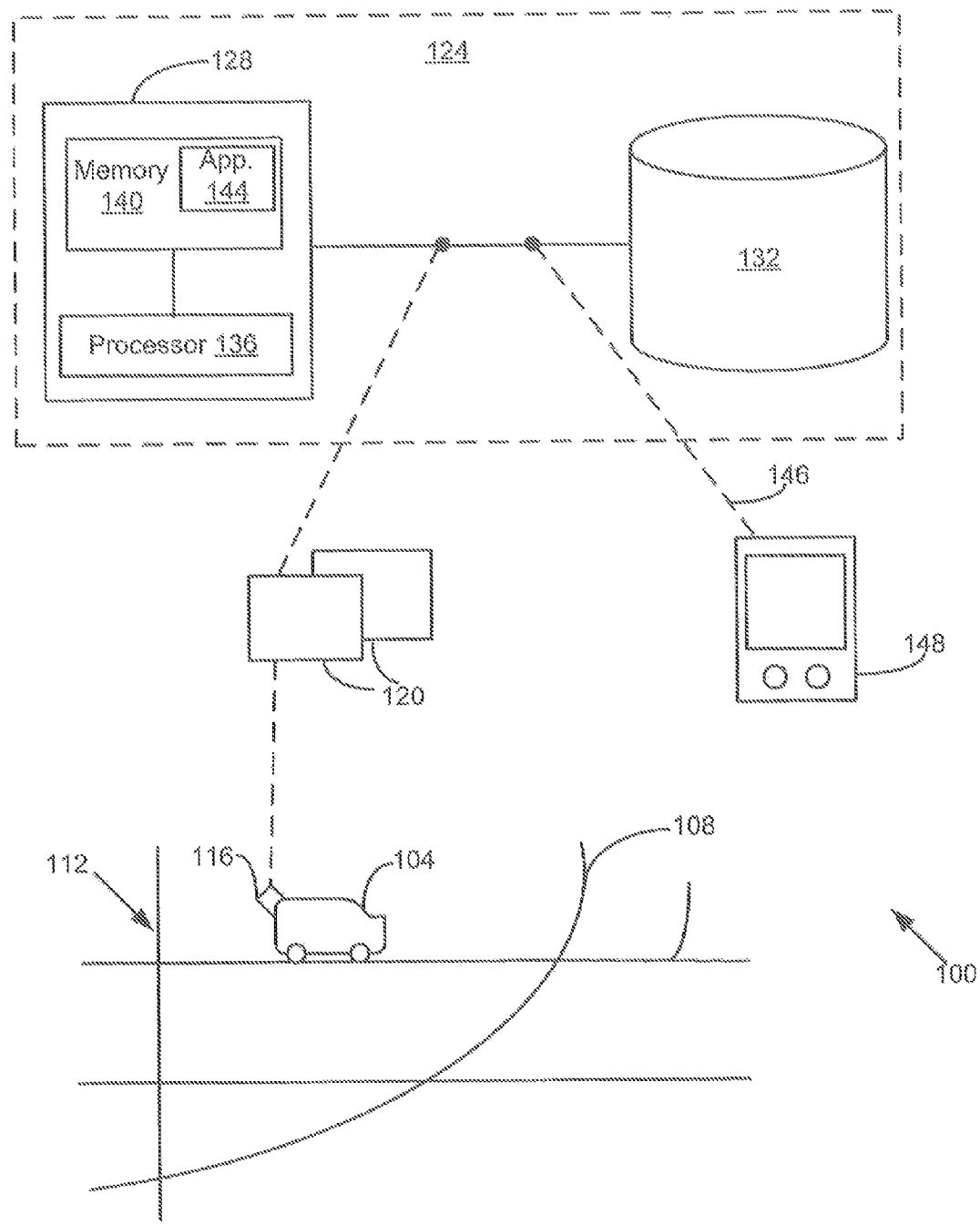
FIG. 1 is a diagram of an exemplary geographic data and/or navigation system for navigating on images.

FIG. 1 shows one embodiment of a system 100 for navigation or navigating on images. The geographic data or navigation system 100 includes, but is not limited to, an object 104 travelling on a path network 108 in a geographic region 112, a device 116, a processing device 128, a database 132, and/or an end user device 148. Additional, fewer, or different components may be provided. For example, a proxy server, a name server, a map server, a cache server or cache network, a router, a switch or intelligent switch, additional computers or workstations, a user interface, administrative components, such as an administrative workstation, a gateway device, a backbone, ports, network connections, and/or network interfaces may be provided. While the components in FIG. 1 are shown as separate from one another, one or more of these components may be combined.

The object 104 is a vehicle, such as a car, truck, motorcycle, bicycle, Segway, or other transportation device or mechanical device used to move on the path network 108. Alternatively, the object 104 may represent a pedestrian, such as a human being or animal, that walks or moves along the path network 108. The path network 108 is a road network and/or a collection of other pathways. For example, the path network 108 is a road network made up of various roads. The roads may be used to drive vehicles on, such as local and neighborhood streets as well as highways. Also, instead of or in addition to traditional streets, the path network 108 may include bicycle roads or paths, walking paths, or other travel paths. The path network 108 is in the geographic region 112, such as a city, a suburb, a state, a country, and/or other geographic region.

The object 104 travels along or moves about the path network 108 to collect data. Alternatively, the object 104 does not travel along the path network 108 and travels over open areas in various patterns to collect data. A supporting device or housing 116 is attached or connected with or carried by the object 104. The supporting device 116 may be or may include equipment to collect data representing an area about or around a road or path or other area. For example, the collected data may be imagery or video/camera data (such as in the visible spectrum or other spectrum).

In one embodiment, the supporting device 116 is a housing or container that is attached to or carried by a pedestrian (the object 104), and as the pedestrian is on and/or moving on a path, sidewalk, or other area, equipment, such as a video and/or photograph camera, in the supporting device 116 collects data. In another embodiment, the supporting device 116 is a housing or container that is attached to a vehicle, and as the vehicle is on and/or moving on a road, equipment, such as a video and/or photograph camera, in the supporting device 116 collects or gathers data corresponding to the surrounding area. Alternatively, the supporting device 116 may be the camera or camera device itself or parts thereof. The supporting device 116 may be positioned at a backend of a vehicle and may be angled to enhance collection. In other embodiments, the supporting device 116 may be positioned any place on a vehicle or pedestrian and in any direction.

The collected data is stored on one or more computer-readable media 120, such as a CD-ROM, DVD, flash drive, hard drive, or other tangible media suitable to store data. Different types of data may be stored on the same medium 120. Alternatively, separate media 120 may be used to store separate or different types of data. In one embodiment, photographs (such as digital or electronic photographs), video images, and/or other image data collected by the object 104 and/or the device 116 are stored in one or more media 120. Alternatively, the media 120 may be signals carrying or having data, such as image data. The collected image data or digital images may represent areas or regions about or around a path, road, or other area. The collected images may include geographic features, such as roads or paths (such as sidewalks), road or path markings (such as cross-walks or lane markings), road or path signs, points-of-interest ("POIs") such as buildings, parks, museums, etc., and other features or objects.

The collected image data, via one or more media 120, is sent to a map, geographic, and/or navigation data developer 124, such as NAVTEQ North America, LLC located in Chicago, Ill. For example, a medium 120 may be mailed to or brought to the map developer 124. Alternatively, some or all of the collected data may be transmitted to the map developer 124 via a wireless and/or wired network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection. The term "map developer" may also include third-party contractors.

The processing device 128 maintained by the map developer 124 receives the collected data, such as the image data. The processing device 128 is one or more servers, computers (such as a desktop tower or a laptop processing unit), processors, and/or other electronic processing systems or devices. The processing device 128 includes, but is not limited to, a processor 136, a memory 140, and a navigation software application 144. Additional, fewer, or different components may be provided. For example, a user interface or workstation with one or more input devices may be included or in communication with the processing device 128.

The processor 136 is a general processor, application-specific integrated circuit ("ASIC"), digital signal processor, field programmable gate array ("FPGA"), digital circuit, analog circuit, or combinations thereof. In one embodiment, the processor 136 is one or more processors operable to control and/or communicate with the various electronics and logic of the processing device 128. The memory 140 is any known or future storage device. The memory 140 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 140 may be part of the processor 136. The memory 140 is operable or configured to store collected image data and/or other data.

The processor 136 is configured or adapted to execute the navigation software application 144, which may be stored in the memory 140 or other memory. For example, the navigation software application 144 modifies and/or creates and associates data with collected image data for navigation purposes. In one embodiment, the application 144 identifies images and determines whether image components, such as pixels, of the images correspond to a ground or floor area (such as areas that can be driven or walked upon or other ground areas). For each identified image, the application 144 designates some or all of the ground pixels/image components as navigable and/or creates associations between them for routing purposes. The application 144 also generates correlations and associations between images so that relationships between images for routing may be determined. Accordingly, the application 144 may use collected images to create a navigation system or database to route or navigate directly on images. In other embodiments, the application 144 may also including routing logic or software to perform navigation-related, guidance, and/or routing functions for end user navigation experiences.

The database 132 is in communication with the processing device 128. The database 132 is an image database (such as a memory or storage hardware medium) that stores image data prior to and/or after being processed, such as via the processing device 128 and/or the application 144. Alternatively, the database 132 may also store other collected or processed data. In one embodiment, images collected via the system 100 are stored in the database 132. Some or all of the stored images are then processed, such as via the processing device 128, for navigation purposes. Processed image data and/or associated data used for navigating on the images are stored with the images in the database 132. Alternatively, processed image data and/or associated data are stored separately from the respective images. One or more indexes, identifiers, look-up-tables, or other files or data may be used to associate images with respective data used for navigating on the images. In another embodiment, the processing device 128 first processes received images and then stores the post-processed images and/or associated data in the database 132.

The end user device 148 may be in communication with the map developer 124 via a connection or network 146. For example, the network 146 may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection. The end user device 148 is an in-vehicle navigation system, a personal navigation device ("PND"), a portable navigation device, a cellular telephone, a mobile phone, a personal digital assistant ("PDA"), a watch, a computer (such as a laptop or desktop), and/or other device. In one embodiment, the end user device 148 is a cellular telephone, such as a cellular telephone provided by Nokia Corporation located in Espoo, Finland.

In one embodiment, an end user may download or receive multiple images or photographs of one or more geographic areas from the map developer 124 via the end user device 148. The end user selects an origin point on one image and a destination point on another image. A route is generated directly on images for navigating from the origin point to the destination point. The route includes a connection of pixels from the origin point to the destination point via multiple images, and graphics representing the route are displayed or superimposed on the respective images as guidance for the end user.

FIG. 2 illustrates an embodiment of components of a device 201. For example, the device 201 may be an embodiment of the object 104, such as a vehicle, or may be similar to the supporting device 116. In one embodiment, the device 201 is a support or housing that includes equipment to collect image data. For example, the device 201 is removably or integrally attached or connected with a vehicle. The device 201 is positioned at a top backend of the vehicle. Alternatively, the device 201 may be positioned on or in any part of the vehicle at any angle. In another embodiment, the device 201 is attached to or carried by a pedestrian. For example, the device 201 may be a cellular telephone or other device including a camera.

The device 201 includes, but is not limited to, a processor 205, a memory 209, a positioning system 217, and a camera system or device 213. Additional, fewer, or different components may be provided. For example, an input device may be provided. The input device may be one or more buttons, keypad, keyboard, mouse, stylist pen, trackball, rocker switch, touch pad, voice recognition circuit, or other device or component for controlling or inputting data in one or more of the components of the device 201. Also, laser devices, such as one or more Light Detection and Ranging ("LIDAR") devices, or other data collection devices or systems may be provided. While the components in FIG. 2 are shown as separate from one another, one or more of these components may be combined. Also, some of the components may be provided outside of the device 201. For example, if the device 201 is a housing attached to a vehicle, the positioning system 217, the processor 205, the memory 209, an input device, and/or other components may be in the vehicle or another part of the vehicle while the camera system or device 213 is in the device 201.

The processor 205 is similar to or different than the processor 136. The processor 205 is configured to operate the collection equipment, such as the positioning system 217, the camera system or device 213, and/or other devices. For example, the processor 205 sends commands to the various collection devices to collect data and synchronizes or manages the different components. Also, the processor 205 is configured to associate and store data from the collection devices into the memory 209. The memory 209 is similar to or different than the memory 140. The memory 209 is operable or configured to store collected image data and/or other data. The memory 209 may be part of the computer-readable medium 120 or may be a separate memory.

The positioning system 217 is a global positioning system ("GPS"), one or more mechanical and/or electrical sensors, one or more gyroscopes, a local positioning system, one or more direction sensors, or other system or device for providing position data, such as location data (e.g., longitude, latitude, altitude, and/or other coordinates) and/or direction data, of the device 201, components thereof, or an attached object, such as a vehicle. The positioning system 217 may include an inertial measurement unit ("IMU"), or the IMU may be separate from the positioning system 217. An IMU may include one or more accelerometers, gyroscopes, and/or other components. For example, the IMU detects current rate of acceleration as well as changes in rotational attributes, such as pitch, roll, and yaw. Data from the IMU may be used for error corrections, data compensation, and other purposes. Position data may be associated with respective image frames collected via the camera system 213.

The camera system 213 includes one or more cameras used for taking pictures or videos of a surrounding area. For example, the camera system 213 includes a video camera that records video data or frames (such as in the visible light spectrum or other spectrum) representing geographic features of and about a road, path, or other area. The camera system 213 may also capture still photographs or image frames separate from the video data. The video and/or image data may be captured and stored in a variety of image formats.

FIG. 3 shows an embodiment of images 300, 304, and 308 collected and/or used in the system 100. For example, the images 300, 304, and 308 were collected via the camera system or device 213 and then were sent or transmitted to the map developer 124. In one embodiment, the images 300, 304, and 308 are in a bitmap, JPEG, GIF, and/or other image format, and they may be panoramic or other image types.

The images 300, 304, and 308 are image or video frames of one or more geographic areas. For example, the images 300, 304, and 308 are street view images or images of streets, roads, and/or other areas captured while driving or walking, such as along one or more roads. In one embodiment, the image 300 shows a view towards a road intersection. The image 304 show a view while turning at a corner of the road intersection, and the image 308 shows a geographic view after the turn.

The image 300 includes representations of geographic features such as a sky area 312, a ground area 316, one or more roads 320, and a building or store 314. The sky area 312 is part of the image 300 that represents a natural area above ground level and the ground area 316 includes part of the image that represents ground level, such as the road 320 and a sidewalk or path 324. The ground area 316 may also represent other ground or ground level areas that are not part of a path or road, such as a park, grass area, and/or water regions (e.g., like a pond, river, lake, etc.). The images 304 and 308 include representations of geographic features such as sky areas 332 and 344, respectively, as well as, ground areas 336 and 348, respectively. The sky areas 332 and 344 may be similar to or different than the sky area 312, and the ground areas 336 and 348 may be similar to or different than the ground area 316.

The images 300, 304, and 308 are composed of image components or pixels. A pixel may be a single point of a raster image. For example a pixel is the smallest screen element that can be controlled, and each pixel has an address or coordinate. Pixels may be arranged in a two-dimensional grid pattern and may be represented as squares or dots. Each pixel may be designated with an intensity and/or color so that the combination of the pixels represents the desired image. In one embodiment, the image 300 includes pixels 328, the image 304 includes pixels 340, and the image 308 includes pixels 352. The pixels 328, 340, and 352 may be ground pixels. For example, the pixels 328, 340, and 352 may be identified as pixels that correspond to a ground area, and these pixels may be designated as navigable for routing purposes.

Figure 4:
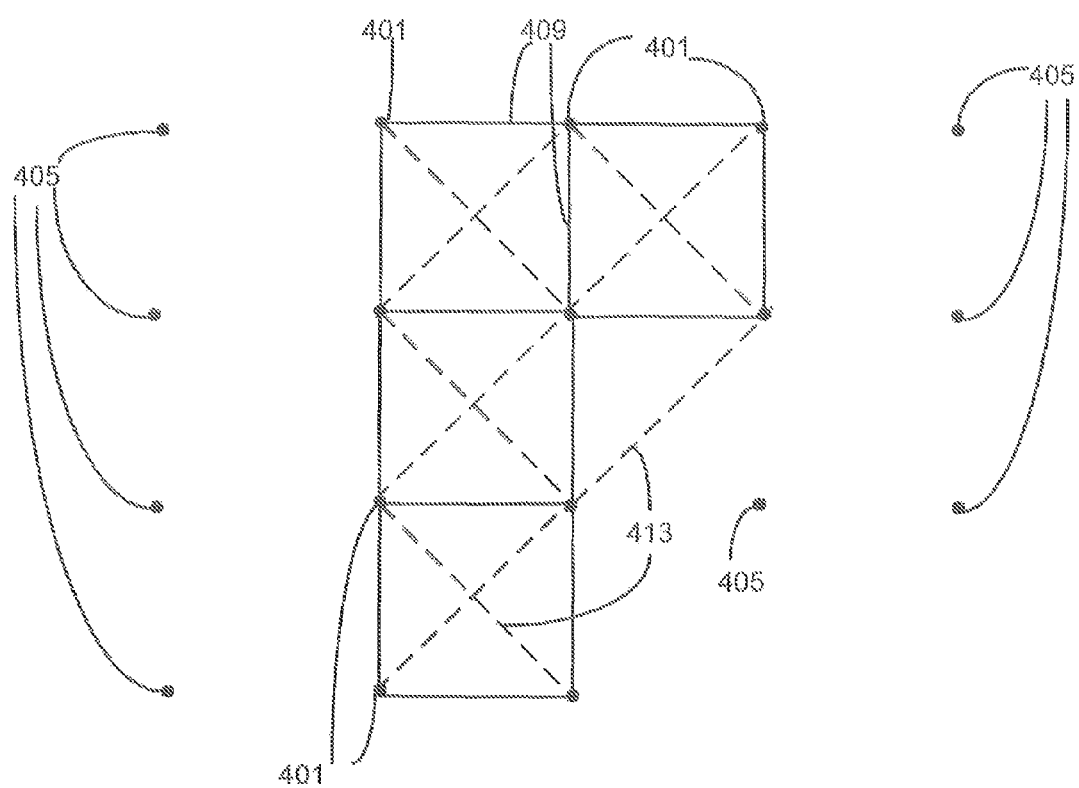
FIG. 4 illustrates an exemplary correlation or association of image components.

FIG. 4 illustrates an exemplary correlation or association of image components or pixels. For example, the pixels 401 represent pixels that represent a ground/floor area or area in which one can drive or walk upon of the image 300, 304, and/or 308. The ground pixels 401 may be associated with roads, paths, navigable geographic features and/or other areas. The pixels 405 are pixels that correspond to geographic features that are not part of a floor/ground or area that can be driven or walked upon. For example, the pixels 405 correspond to a sky area, a side of building, and/or other geographic feature.

In one embodiment, the pixels 401 are designated as navigable and the pixels 405 are designated as non-navigable, such as by the processing device 128. By designating some pixels as navigable (such as the ground pixels 401) and some pixels as non-navigable (such as the pixels 405), certain connections between pixels may be made or correlated for routing on the respective image. Also, cost factors or cost values for some or all pixels or relationships between pixels may be designated for routing purposes, such as via the processing device 128.

In one embodiment, the connections or correlations 409 represent vertical and horizontal connections between navigable pixels 401 (e.g., a possibility of four connected neighbors may be made). The connections or correlations 413 represent diagonal connections between navigable pixels 401 (e.g., a combination of vertical, horizontal, and diagonal relationships gives a possibility of eight connected neighbors). Based on the potential connections and the designation of navigable or non-navigable, a variety of routing connections may be made between navigable pixels 401 for navigating on an image. Determining the relationship or correlation of navigable pixels 401 may occur during execution of a routing algorithm or may be pre-stored for faster processing during end user processing. Data designating navigability of pixels as well as other correlation and/or designation data may be stored with or separate from respective images in the database 132 and/or other memory.

Figure 5:
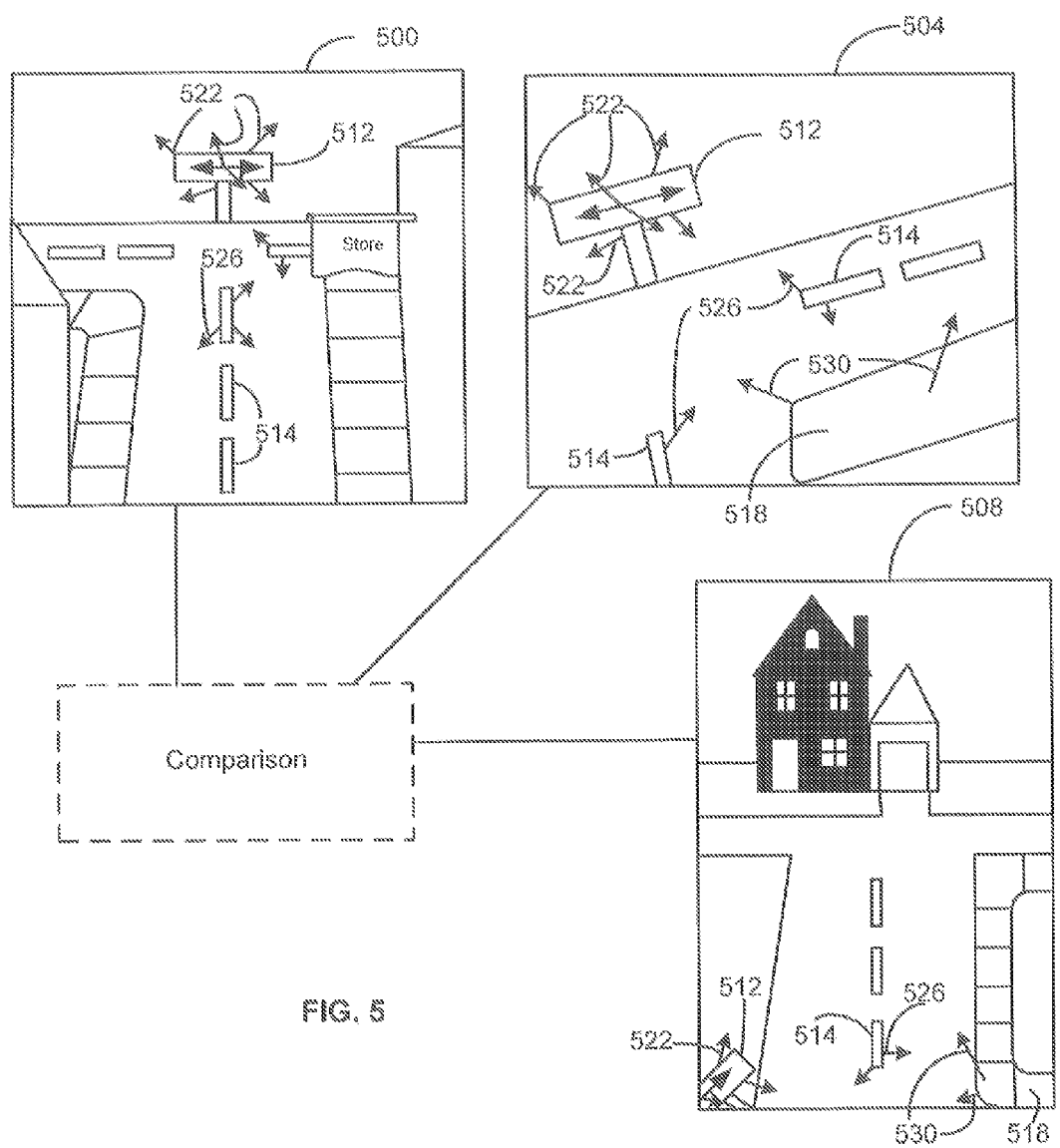
FIG. 5 illustrates an exemplary process regarding images, such as the images of FIG. 3.

Besides determining navigable pixels for routing on individual images, connections and/or correlations for routing and navigation between images are also determined. FIG. 5 shows an exemplary process to correlate and/or associate collected images. For example, invariant component processing is used to determine common features between images, and images 500, 504, and 508 illustrate the images 300, 304, and 308, respectively, undergoing such processing. Invariant components or features are points, gradients, vectors, and/or other components of objects or portions thereof in an image that are invariant to scale, rotation, and/or illumination or brightness of the objects or portions thereof. For example, invariant components of an image or objects in the image may be determined by using a scale invariant feature transform ("SIFT") or other invariant component generation techniques or methods.

In one embodiment, for illustrative purposes, invariant or independent components/features of the images 500, 504, and 508 are represented by gradient vectors. For example, invariant components or gradient vectors 522 correspond to or are associated with a sign 512 shown in the images 500, 504, and 508. Because the sign 512 has a distinctive pattern, symbol, and/or structure, the corresponding gradient vectors 522 and correspondence between them also have a distinctive pattern or quality. Gradient vectors 526 correspond to lane markings 514 shown in the images 500, 504, and 508. Also, gradient vectors 530 correspond to a sidewalk 518 or portion thereof shown in the images 504 and 508. More or less gradient vectors or scale invariant processing may be provided.

The gradient vectors 522, 526, and/or 530 are invariant components of the respective geographic features that are independent or substantially invariant to scale, rotation, and/or brightness. For example, the gradient vectors 522, 526, and/or 530 of the respective objects would be substantially similar to gradient vectors of other images of the objects (or similar objects), even if the other images are more or less bright, show a different size or scale of the respective geographic objects, and/or show a rotated object, such as rotation in the in-plane. Accordingly, different images may be analyzed or compared based on at least theses invariant components to determine if the images share common geographic feature, such as the road sign 512, the lane markings 514, and/or the sidewalk or corner 518. Instead of or in addition to scale invariant processing, other techniques for comparing and associating images may be used. For example, position data for each image, such as collected via the positioning system 217, may be used to assist in grouping or associating images as well as assist in determining common geographic features between images. Alternatively, position data is not used. Also, other vision or image processing may be used to associate one image to another.

By determining common geographic features between images or creating association between images, the images and/or pixels thereof may be aligned or correlated. For example, it may be possible to link or correlate one or more pixels of one image with one or more pixels of another image. By knowing how the different images connect or associate with each other, routing between images may be accomplished via connecting or linking pixels between images.

FIG. 6 illustrates exemplary displays of a user device 601. For example, the user device 601 is an end user device, such as the end user device 148, used for routing directly on images. The user device 601 includes, but is not limited to, a display 603, a processor 605, a memory 609, an input device 613, and communication components 617. Additional, fewer, or different components may be provided. For example, audio components may be provided. While the components in FIG. 6 are shown as separate from one another, one or more of these components may be combined.

The processor 605 may be similar or different than the processor 136 or 205, and the memory 609 may be similar or different than the memory 140 or 209. The display 603 is in communication with the processor 605. The display 603 is any mechanical and/or electronic display positioned for accessible viewing in, on, or in communication with the device 601. For example, the display 603 is a touch screen, liquid crystal display ("LCD"), cathode ray tube ("CRT") display, a plasma display, or other display. The display 603 may act as a hardware implementation of a user interface or a portion thereof.

The input device 613 and the communication components 617 are also in communication with the processor 605. The input device 613 may be one or more buttons, keypad, keyboard, mouse, stylist pen, trackball, rocker switch, touch pad, voice recognition circuit, or other device or component for controlling or inputting data in one or more of the components of the device 601. The communication components 617 may be wireless transmitter and/or receiver components (such as an antenna and/or power amplifier), wired connections or ports, or other components for data communication.

In one embodiment, the user device 601 displays different images 621, 633, and 641 on the display 603 to provide navigation and/or guidance to an end user. The displayed images 621, 633, and 641 are the images 300 or 500, 304 or 504, and 308 or 508, respectively, or copies thereof. For example, the displayed image 621 shows a graphical representation of an origin or origin point 625 and a graphical representation of a route portion 629. The displayed image 633 shows a graphical representation of a route portion 637. The displayed image 641 shows a graphical representation of a route portion 645 and a graphical representation of a destination or destination point 649. The graphical representations may be superimposed on the respective images or may be integrated into the respective images.

The route portions 629, 637, and 645 form a route to provide the end user navigation and/or guidance from the origin 625 to the destination 649. The route is created or generated from linking ground pixels (which were designated as navigable) from the different images together based on the processes mention herein. Accordingly, navigation or routing directly on images is provided. Unlike navigation systems that rely on road segment records and node records of a map database to form a route from an origin to a destination, the systems and methods herein describe routing directly on collected images via pixels or image components.

Figure 7:
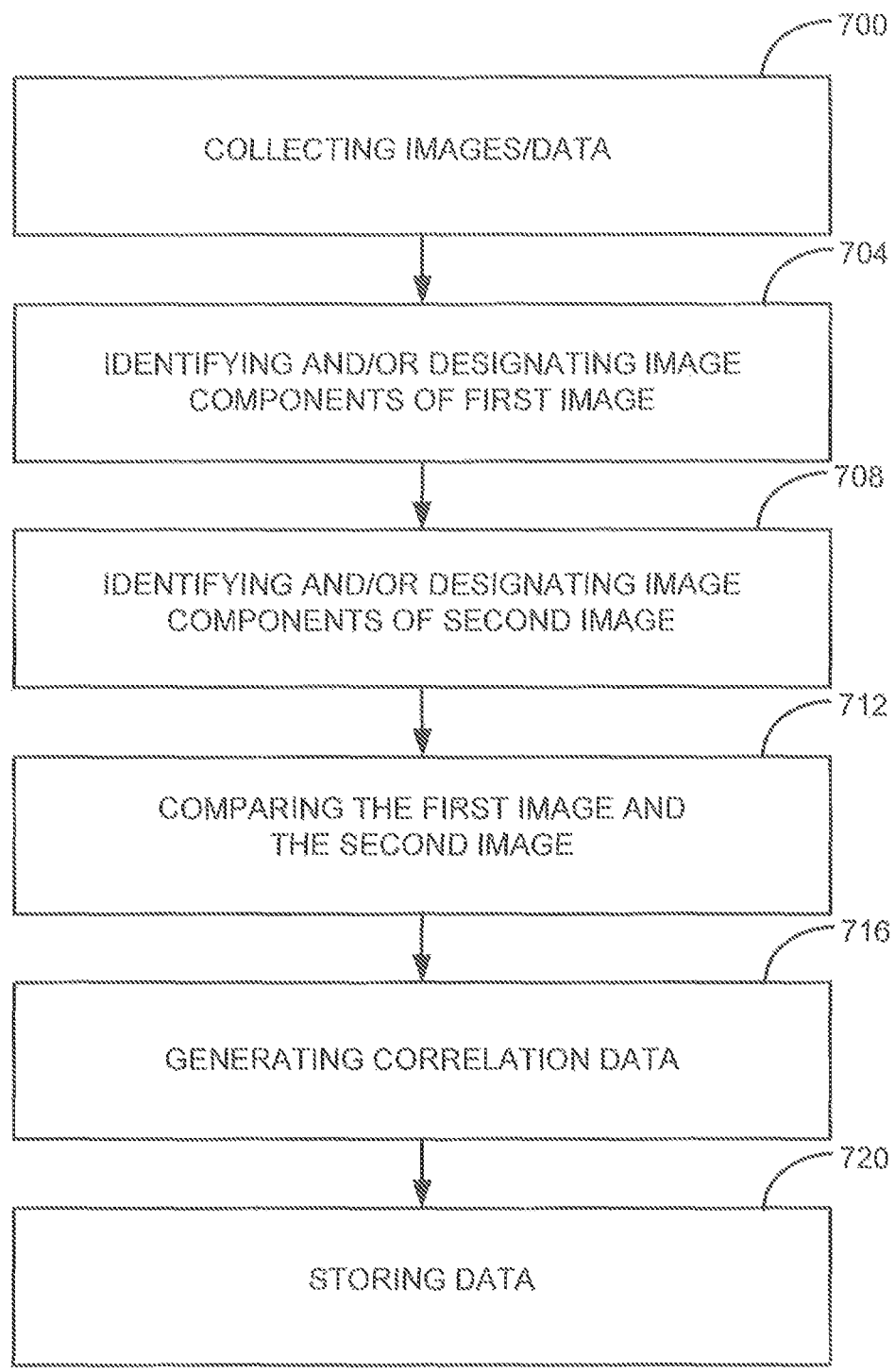
FIG. 7 is a flowchart of an exemplary method for developing a navigation system or database to route directly on images.

FIG. 7 is a flowchart of an exemplary method for developing a navigation system or database to route directly on images. Fewer or more steps or acts may be provided, and a combination of steps may be provided. Also, the steps or acts may be performed in the order as shown or in a different order.

The method is implemented by the system and/or devices described herein or by different devices or systems. One or more steps or processes of the method may be fully or partially automated (such as via a computer or algorithm).

A plurality of images (such as one or more image frames) of geographic features or areas are captured or collected by a camera, such as the camera system 213 (Step 700). Other data may be collected as well. In one embodiment, the map developer 124 employs a driver to drive a vehicle, such as the object 104, on one or more roads to collect data. For example, image data, such as photographs and/or videos, of geographic features or areas about roads or paths are collected. Other data including positioning information or data, such a GPS data (e.g., latitude, longitude, and/or altitude) corresponding to the vehicle or data collection devices supported by the vehicle may be collected. In an alternate embodiment, instead of or in addition to driving or riding a vehicle to collect images, a pedestrian may use a supporting device, such as the device 116 or 201, to collect the image data and/or other data. For example, a pedestrian carries or puts on a backpack or other transportation device (which may support the device 116 or 201) while walking on a path or open area to collect data, such as images or video.

The captured or collected images and/or other data are sent to the map developer 124. In one embodiment, the image data are associated with position data and/or other data, and all the data are sent in the same data file. Or, different data are sent separately with links or indicators associating the different data with each other. In one embodiment, images, such as the images 300, 304, and/or 308, are stored on a computer-readable medium, such as the medium 120, and other collected data are stored on different media. Alternatively, different types of collected data may be stored on the same computer-readable medium. The computer-readable media are delivered to an office or facility of the map developer 124. For example, after a vehicle is finished collecting data, it returns to a facility of the map developer 124. Or, the media may be mailed or sent by carrier to a certain office or facility. Alternatively, the collected data are transmitted to the map developer 124 via a wireless or wired network.

The images and/or other data are received by a processing device of the map developer, such as the processing device 128. In one embodiment, the processing device 128 processes image data prior to storing the image data and/or associated data in the database 132. Alternatively, when image data is received, it is stored in the database 132, and the processing device 128 processes selected image data on demand or based on requests.

A first image, such as the image 300, is selected. Image components, such as pixels, of the first image are identified (Step 704). For example, the processing device 128 identifies pixels, such as the pixels 328, that correspond to a ground area. Computer vision algorithms, image processing, and any known or future techniques may be used to determine ground or floor areas in images. The ground or floor areas may include elevated areas, such as different floors in which a pedestrian or vehicle can move about. For example, the software application 144 may determine a horizon point in an image to distinguish between ground and sky areas. Also, object detection processing may be used to determine a street, sidewalk, or other floor or ground areas as opposed to sides of buildings and other geographic features that cannot be crossed or treaded upon.

Once the ground pixels are identified, some or all of them are designated as navigable. Alternatively, the pixels may be designated as navigable at the same time when they are identified. In one embodiment, a data tag, header, or ID, such as a numerical or binary code, designating a pixel as navigable is stored or associated with a respective pixel address. Employees or personnel may designate certain portions of an image, such as roads or paths, to be navigable, such as via a work station or user interface. Alternatively, all ground pixels are designated as navigable. Furthermore, correlations or connections, such as illustrated in FIG. 4, may be pre-stored at this stage.

Cost factors or values may also be designated. For example, centers of roads or paths (or even the center of the image) may be more desired to route upon than the sides, and so center pixels may have less cost associated with them then side pixels. Or, areas in which routing would be less desired (because of congestion, hazards, etc.) would be associated with a higher cost than other areas. The cost value may be a data tag, numerical value, or ID that is associated with a pixel address. The cost values are considered by a routing algorithm to determine a route path. Different cost values may attract or detract a route or portions thereof.

Also, an image with a perspective view may exhibit perspective display distortion in which a pixel at a top of the image may not represent as large of an area as a pixel at a bottom of the image, or vice versa. Accordingly, such distortion may impact the routing and/or cost designations of the respective pixels or image components. Image transformation techniques may be used (such as to change a perspective view into a bird's eye or straight view) to correlate or designate pixels or image components in a uniform manner. Meaning, when designating pixels or image components, image data is transformed so that each of the image components may cover substantially the same area, which may facilitate cost and/or routing designations.

Cost values or factors for traversing between images may also be determined. For example, if certain images can be skipped (such as due to proximity to other images or redundancy of similar images), then a higher cost value may be associated with them. Accordingly, certain images may be skipped for routing based on the cost associated with them, and so fewer images may be presented to the end user. The cost between images may be determined during the processing of the images or may be determined during the actual routing calculations for end user navigation.

A second image, such as the image 304 and/or the image 308, is selected. Image components, such as pixels, of the second image are identified (Step 708). For example, one or more images other than the initial image are processed similar to the first image. Pixels are similarly identified and designated, and cost factors and values may also be provided.

The images are compared for correlation (Step 712). For example, the first image is compared to the second image. Any combination of images may be compared. In one embodiment, the image 300 or 500 is compared to the image 304 or 504, and the image 304 or 504 is compared to the image 308 or 508. For example, the images are compared to determine one or more common geographic features, such as the sign 512, the lane markings 514, and/or the sidewalk or corner 518. In one embodiment, SIFT is used to determine scale-invariant features or data components of the images for comparison. Description and details on the process of determining invariant components of images or objects therein, such as using SIFT, may be provided in the U.S. Pat. No. 6,711,293, entitled METHOD AND APPARATUS FOR IDENTIFYING SCALE INVARIANT FEATURES IN AN IMAGE AND USE OF SAME FOR LOCATING AN OBJECT IN AN IMAGE, which is hereby incorporated by reference. Other scale-invariant, rotation-invariant, and/or brightness-invariant components or data components may be determined using other techniques or methods that may be similar to or different than SIFT.

Furthermore, other techniques instead of or in addition to invariant component processing may be used to determine common geographic features or associations between the images. For example, any known or future image processing techniques to associate a feature of one image to the same or similar feature of another image may be used. Also, position data of the respective images may be used to help group and associated images. For example, if coordinate data of where the images were taken are known, then software may be used to determine a natural progression of flow of the image data, and that may be used to estimate common connections or features of the images. Alternatively, position data is not used.

Correlation data between the images is generated (Step 716). By determining common geographic features or associations between the images, then the navigable pixels of the respective images may be linked or correlated together. For example, by knowing that the images 300, 304, and 308 share the same road, sign, and/or corner, the processing device 128 can align the images or components thereof together. In one embodiment, one or more navigable pixels of the image 300 are linked with one or more navigable pixels of the image 304 (e.g., a pixel corresponding to one lane marking 514 in one image is correlated with a pixel corresponding to the same lane marking 514 in another image), and, similarly, one or more navigable pixels of the image 304 are linked with one or more navigable pixels of the image 308. The correlation data generated may be in the form of a data tag, header, ID, binary or numerical code, or other data. Alternatively, correlation data between images may be generated without determining or considering common geographic features. For example, the map developer, personnel thereof, and/or software may link images or components together (such as via a visual or position analysis using a computer) even if the images do not share a common geographic feature (e.g., two or more images may be geographically proximate but lack a common image area or attribute).

The correlation data and/or processed data or other data is stored, such as in the database 132 or other memory (Step 720). For example, the identification data, designation data, and/or correlation data for pixels of the processed images may be stored with or separate from the images. Indexes, look-up-tables, data files, pointers, and/or other techniques and structures may be used to link and associate the data. Identifying and designating pixels as well as correlating pixels between images allows navigation algorithms to route directly on and between the images to provide navigation and guidance to end users.

Figure 8:
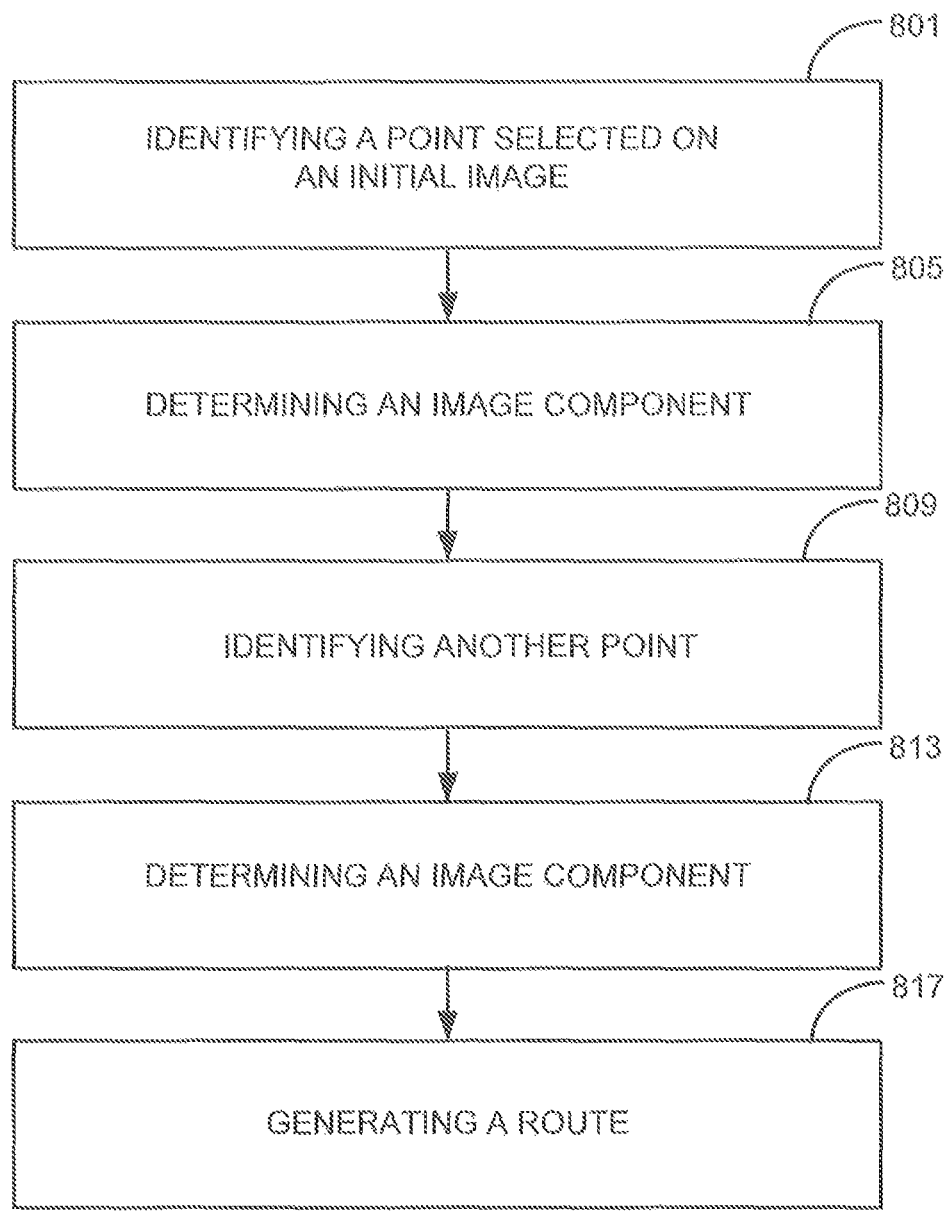
FIG. 8 is a flowchart of an exemplary method of routing directly on images.

FIG. 8 is a flowchart of an exemplary method of routing directly on images, such as the images 300, 304, and/or 308. Fewer or more steps or acts may be provided, and a combination of steps may be provided. Also, the steps or acts may be performed in the order as shown or in a different order. The method is implemented by the system and/or devices described herein or by different devices or systems. One or more steps or processes of the method may be fully or partially automated (such as via a computer or algorithm).

In one embodiment, an end user enables a user device, such as the end user device 148 or 601. The end user device may be in communication with processing devices of the map developer 124. For example, the end user opens or executes a website for navigation or images. Alternatively, the end user initializes an application for routing on images. The end user selects an image, such as the image 300 or 621, and selects a point of origin, such as the point 625, on the image. The point selected on the initial image is identified (Step 801). For example, the end user physically touches, such as with a finger or device, a point on the image (such as the image displayed on a screen) to be an origin point. Alternatively, the end user uses a selection function via a mouse or other input device. Also, the end user may use a search function to type in a point of origin. Furthermore, current position data or information, such as obtained via a GPS device or positioning system, may be used to select the origin point of the user. The location of selection is identified. In one embodiment, an x-y coordinate system is used to determine the location of the point selected.

Based on the identified location of the selection, an image component, such as a navigable pixel associated with the origin point 625, is determined (Step 805). For example, one or more navigable pixels that correspond to the identified selected point are determined. The one or more pixels may have addresses directly associated with the location of the selected origin point. Alternatively, the pixel address may be different than the selected point location. For example, the end user may select a point that is above or not on a ground or floor area or that does not overlay a navigable pixel. Accordingly, the closest or logically suitable navigable pixel or pixels may be determined or selected to correspond to the selected origin point.

The end user selects a point of destination. For example, the end user selects another point on the same image of the point of origin. In another embodiment, the end user selects another image, such as the image 308 or 641, and selects a point of destination, such as the point 649, on the image. The point selected is identified (Step 809). For example, the selection and the identification of the destination point may be similar to the selection and the identification of the origin point in Step 801. An image component, such as a navigable pixel associated with the destination point 649, is determined (Step 813). The determination of one or more pixels corresponding to the destination may be similar to the determination of Step 805.

A route is generated between the selected origin and destination, such as based on retrieving and/or analyzing correlation data (Step 817). For example, intermediate pixels between the origin and the destination are connected via a routing algorithm. In one embodiment, one or more image pixels associated with the origin 625 are connected, correlated, or linked with other navigable or adjacent intermediate pixels on the image 300 or 621. Once the connection of pixels for the initial image is complete (and the destination is not reached), a second image is determined to continue the routing. The second image may be the last image having the destination or may be an intermediate image. For example, the second image is the image 304 or 633. One or more navigable pixels of the image 300 or 621 are linked with one or more navigable pixels of the image 304 or 633, such as based on correlation data between the images. Routing continues on the second image by linking navigable or intermediate pixels together. Then, one or more navigable pixels of the image 304 or 633 are linked with one or more navigable pixels of the image 308 or 641, such as based on correlation data between the images. The routing continues on this last image by linking navigable, adjacent, and/or intermediate pixels together to the destination 649.

A Dijkstra method, an A-star algorithm or search, and/or other route exploration or calculation algorithms may be used to form lines, curves, or routes between the pixels or image components. For example, correlations illustrated in FIG. 4 may be utilized. The routing algorithm may take designated cost factors or values into consideration when generating the route, and perspective distortion and/or designations thereof may be taken into consideration. Furthermore, the routing algorithm may determine or consider costs for navigating between certain images. For example, some images may be skipped altogether when routing, such as if the image is too close in proximity or data representation to a previous or subsequent image. The routing processes for this embodiment occur or are executed by the map developer 124. For example, the application 144 is used to perform the routing and provide the navigation to the end user device, such as via a server connection.

A graphical representation of the route or portions thereof may be presented or displayed to the end user. The graphical representation may be superimposed or integrated graphic models, icons, or other representations. Animations, simulations, and other graphics associated with navigation guidance may be provided. Also, audio and text directions may be provided.

The different steps, acts, or processes of the methods described herein may be mixed and matched. Also, other methods, such as a product-by-process method, may be performed based on the disclosure herein.

Alternatives

As mentioned above, the images collected for the navigation features are collected by the map developer 124. Alternatively, end user images or images collected by a community may be uploaded and used for the processes described. For example, end users may collect images of areas via cell phones or cameras and send the images for processing for navigation.

Also, the images may be substantially real-time images or video streams taken from a web-cam or other devices. Accordingly, the techniques of navigating directly on images may be used on substantially real-time image or video frames.

Furthermore, the method for developing the navigation system and/or database to route directly on images (FIG. 7) is described above as being accomplished via the map developer 124 prior to routing. In an alternative embodiment, those processes may be executed on an end user device. For example, the application 144 and other components may be present on an end user device that can process images without sending them to the map developer 124. Furthermore, the steps may occur substantially at the same time or in parallel with the routing processing.

Also, the method of routing directly on images (FIG. 8) is described above as having the end user device communicate with the map developer 124, such as via a server application. Alternatively, the routing application may be on the end user device. Accordingly, the end user device may route directly on stored or received images without communicating with any other device.

As mentioned above, routing directly on images focuses on connecting or correlating pixels of images. Alternatively, images other than raster images may be used. For example, scalable vector graphics ("SVG") images or other extensible markup language ("XML") based file formats may be used, and the correlation of other image components, such as vector components, may occur.

Furthermore, routing on images mentioned above focuses on navigating on a ground or floor areas. Alternatively, navigation in the air or sky may be provided. For example, connecting pixels or image components that relate to above ground or sky areas may occur, such as for flight navigation. Also, connection of pixels or image components over water areas may also be provided, such as for water navigation.

As mentioned above, the navigation provided is directly on images, and traditional road segment and node records need not be used. However, the navigation data and processes may be associated with road network data. For example, the processed image data may be associated with road segment records and/or node records of a traditional map database so that both route generation using map database records and navigation directly on images may be utilized, such as in a hybrid system. In one embodiment, node and/or roads segment data records are used to generate part of a route, and then navigating directly on images or image components is used for another part of the route.

As mentioned above, collected image data is used for direct navigation. Alternatively, other collected two-dimensional ("2D") or three-dimensional ("3D") data may be used. For example, 3D LIDAR point clouds may be used, such as instead of or in addition to image pixels, for creating routes. In one embodiment, routes are generated directly on 3D points of LIDAR data using techniques described herein. Images or sections of the 3D point clouds may be displayed to an end user with a graphical representation of a route for guidance and navigation.

The logic, data, software, or instructions for implementing the systems, processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or computer-executable instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

The invention claimed is:

1. A method for a navigation system, the method comprising:
   identifying, using a processor, image components in a first image, the identified image components in the first image designated as navigable;
   identifying, using the processor, image components in a second image, the identified image components in the second image designated as navigable;
   comparing, using the processor, the first image and the second image to determine a common geographic feature shared between the first image and the second image;
   generating, using the processor, correlation data associating at least one navigable image component of the first image to at least one navigable image component of the second image, wherein generating the correlation data is based on the comparison;

storing the correlation data in a hardware medium of the navigation system.

2. The method of claim 1, wherein the identified image components of the first image and the second image correspond to a ground or floor in the respective images.

3. The method of claim 1, wherein comparing the first image and the second image to determine the common geographic feature comprises using scale invariant feature transform.

4. The method of claim 1, wherein the first image and the second image comprise street view images.

5. The method of claim 1, further comprising:
providing a route from an origin point associated with a navigable image component on the first image to a destination point via a navigable image component on the second image.

6. The method of claim 5, wherein the route is associated with intermediate pixels and the intermediate image pixels are designated as navigable pixels.

7. The method of claim 1, further comprising:
receiving a user input of a non-navigable point in the first image; and
selecting a substitution point in the first image logically suitable to correspond to the non-navigable point, wherein the substitution point includes at least one of the identified image components in the first image designated as navigable.

8. The method of claim 7, wherein the substitution point is a closest navigable point to the non-navigable point.

9. An apparatus comprising:
at least one processor; and
at least one memory including computer program code for one or more programs; the at least one memory and the computer program code configured to, with the at least one processor, cause the apparatus to at least perform:
identifying image components in a first image, the identified image components in the first image designated as navigable;
identifying image components in a second image, the identified image components in the second image designated as navigable;
comparing the first image and the second image to determine a common geographic feature comprises using scale invariant feature transform;
generating correlation data associating at least one navigable image component of the first image to at least one navigable image component of the second image;
storing the correlation data in a hardware medium of the apparatus; and
generating a route from an origin in the first image to a destination in the second image based on the correlation data.

10. An apparatus comprising:
a memory configured to store image data comprising navigable image pixels and non-navigable image pixels; and
a processor configured to identify a first navigable pixel in a first image and a second navigable pixel in a second image and generate correlation data associating at least one navigable image pixel of the first image to at least one navigable image pixel of the second image,
wherein the processor is configured to compare the first image and the second image to determine a common geographic feature shared between the first image and the second image.

11. The apparatus of claim 10, further comprising:
a user interface configured to display a route on the image data, wherein the route connects the at least one navigable image pixel of the first image to the at least one navigable image pixel of the second image.

12. The apparatus of claim 11, wherein the user interface is configured to receive inputs directly on images corresponding to the image data.

13. The apparatus of claim 10, wherein the correlation data is based on the comparison, and the comparison is made using scale invariant feature transform.

14. The apparatus of claim 10, wherein the first image and the second image comprise street side images.

15. The apparatus of claim 10, wherein the correlation data identifies intermediate pixels and the intermediate image pixels are designated as navigable pixels.

16. An apparatus comprising:
a memory configured to store image data comprising navigable image pixels and non-navigable image pixels; and
a processor configured to identify a first navigable pixel in a first image and a second navigable pixel in a second image and generate correlation data associating at least one navigable image pixel of the first image to at least one navigable image pixel of the second image,
wherein the processor is configured to receive data indicative of a user input of a non-navigable point in the first image and select a substitution point in the first image logically suitable to correspond to the non-navigable point, wherein the substitution point includes the first navigable pixel.

17. The apparatus of claim 16, wherein the substitution point is a closest navigable point to the non-navigable point.

18. A method for a navigation system, the method comprising:
identifying, using a processor, image components in a first image, the identified image components in the first image designated as navigable;
identifying, using the processor, image components in a second image, the identified image components in the second image designated as navigable;
comparing, using the processor, the first image and the second image to determine a common geographic feature comprises using an invariant component generation technique;
generating, using the processor, correlation data associating at least one navigable image component of the first image to at least one navigable image component of the second image; and
storing the correlation data in a hardware medium of the navigation system.

* * * * *